US010157375B2

(12) United States Patent
Balasubramanian et al.

(10) Patent No.: US 10,157,375 B2
(45) Date of Patent: Dec. 18, 2018

(54) ALTERNATIVE PAYMENT IMPLEMENTATION FOR ELECTRONIC RETAILERS

(75) Inventors: Chandra S. Balasubramanian, Cleveland, OH (US); Michael A. Keresman, III, Kirtland Hills, OH (US); Eric Goodman, Willoughby, OH (US); Adam Ratica, Painesville, OH (US); Scott Rauhe, Lakewood, OH (US)

(73) Assignee: CardinalCommerce Corporation, Mentor, OH (US)

( * ) Notice: Subject to any disclaimer, the term of this patent is extended or adjusted under 35 U.S.C. 154(b) by 1936 days.

(21) Appl. No.: 12/477,483

(22) Filed: Jun. 3, 2009

(65) Prior Publication Data

US 2009/0313147 A1    Dec. 17, 2009

Related U.S. Application Data

(60) Provisional application No. 61/058,449, filed on Jun. 3, 2008.

(51) Int. Cl.
*G06Q 20/12* (2012.01)
*G06Q 20/10* (2012.01)
(Continued)

(52) U.S. Cl.
CPC ........... *G06Q 20/12* (2013.01); *G06Q 20/108* (2013.01); *G06Q 20/227* (2013.01); *G06Q 20/32* (2013.01);
(Continued)

(58) Field of Classification Search
USPC ........................................................ 705/30
See application file for complete search history.

(56) References Cited

U.S. PATENT DOCUMENTS

| 3,806,874 A | 4/1974 | Ehrat |
| 4,720,860 A | 1/1988 | Weiss |

(Continued)

FOREIGN PATENT DOCUMENTS

| EP | 0 668 579 A2 | 8/1995 |
| EP | 1 107198 B1 | 6/2001 |

(Continued)

OTHER PUBLICATIONS

International Search Report, Dec. 29, 2009.
(Continued)

*Primary Examiner* — Garcia Ade
(74) *Attorney, Agent, or Firm* — The Webb Law Firm

(57) ABSTRACT

A method of processing a transaction between a merchant and a buyer over a communication network is provided. The transaction is processed using one of a plurality of alternative payment options and each of the alternative payment options are provided by one of a plurality of alternative payment providers. Each of the alternative payment providers uses a different alternative payment implementation. The method includes: obtaining transaction information from the merchant; returning a redirection URL and an order identifier to the merchant; obtaining a transaction message from the merchant, where the transaction message specifies the type of operation; performing the operation type specified in the transaction message with the appropriate alternative payment provider; and returning a processing message to the merchant containing the results from performing the operation type specified in the transaction message.

23 Claims, 4 Drawing Sheets

(51) Int. Cl.
*G06Q 20/22* (2012.01)
*G06Q 20/32* (2012.01)
*G06Q 20/40* (2012.01)
*G06Q 30/06* (2012.01)
*G06Q 40/00* (2012.01)
*G06Q 20/00* (2012.01)

(52) U.S. Cl.
CPC ......... *G06Q 20/3223* (2013.01); *G06Q 20/40* (2013.01); *G06Q 30/06* (2013.01); *G06Q 40/12* (2013.12)

(56) References Cited

U.S. PATENT DOCUMENTS

| | | | |
|---|---|---|---|
| 4,747,050 A | 5/1988 | Brachtl et al. | |
| 4,799,156 A | 1/1989 | Shavit et al. | |
| 4,800,590 A | 1/1989 | Vaughan | |
| 4,885,778 A | 12/1989 | Weiss | |
| 5,168,520 A | 12/1992 | Weiss | |
| 5,233,655 A | 8/1993 | Shapiro | |
| 5,237,614 A | 8/1993 | Weiss | |
| 5,251,259 A | 10/1993 | Mosley | |
| 5,317,636 A | 5/1994 | Vizcaino | |
| 5,361,062 A | 11/1994 | Weiss et al. | |
| 5,450,491 A | 9/1995 | McNair | |
| 5,478,994 A | 12/1995 | Rahman et al. | |
| 5,479,512 A | 12/1995 | Weiss | |
| 5,485,519 A | 1/1996 | Weiss | |
| 5,490,251 A | 2/1996 | Clark et al. | |
| 5,491,752 A | 2/1996 | Kaufman et al. | |
| 5,513,272 A | 4/1996 | Bogosian, Jr. | |
| 5,544,246 A | 8/1996 | Mandelbaum et al. | |
| 5,557,518 A | 9/1996 | Rosen | |
| 5,590,038 A | 12/1996 | Pitroda | |
| 5,590,197 A | 12/1996 | Chen et al. | |
| 5,627,355 A | 5/1997 | Rahman et al. | |
| 5,657,388 A | 8/1997 | Weiss | |
| 5,671,279 A | 9/1997 | Elgamal | |
| 5,715,314 A | 2/1998 | Payne et al. | |
| 5,742,684 A | 4/1998 | Labaton et al. | |
| 5,757,917 A | 5/1998 | Rose et al. | |
| 5,761,306 A | 6/1998 | Lewis | |
| 5,781,632 A | 7/1998 | Odom | |
| 5,790,667 A | 8/1998 | Omori et al. | |
| 5,790,677 A | 8/1998 | Fox et al. | |
| 5,809,144 A | 9/1998 | Sirbu et al. | |
| 5,815,665 A | 9/1998 | Teper et al. | |
| 5,825,881 A | 10/1998 | Colvin, Sr. | |
| 5,826,245 A | 10/1998 | Sandberg-Diment | |
| 5,884,271 A | 3/1999 | Pitroda | |
| 5,884,288 A | 3/1999 | Chang et al. | |
| 5,887,065 A | 3/1999 | Audebert | |
| 5,909,492 A | 6/1999 | Payne et al. | |
| 5,913,203 A | 6/1999 | Wong et al. | |
| 5,937,068 A | 8/1999 | Audebert | |
| 5,937,344 A | 8/1999 | Wong et al. | |
| 5,956,699 A | 9/1999 | Wong et al. | |
| 5,988,497 A | 11/1999 | Wallace | |
| 5,991,411 A | 11/1999 | Kaufman et al. | |
| 5,991,413 A | 11/1999 | Arditti et al. | |
| 5,995,626 A | 11/1999 | Nishioka et al. | |
| 5,999,624 A | 12/1999 | Hopkins | |
| 5,999,626 A | 12/1999 | Mullin et al. | |
| 6,005,939 A | 12/1999 | Fortenberry et al. | |
| 6,014,650 A | 1/2000 | Zampese | |
| 6,018,724 A * | 1/2000 | Arent | G06F 21/645 705/39 |
| 6,026,166 A | 2/2000 | Lebourgeois | |
| 6,029,150 A | 2/2000 | Kravitz | |
| 6,070,150 A | 5/2000 | Remington et al. | |
| 6,092,053 A | 7/2000 | Boesch et al. | |
| 6,270,011 B1 | 8/2001 | Gottfried | |
| 6,272,492 B1 | 8/2001 | Kay | |
| 6,327,578 B1 | 12/2001 | Linehan | |
| 6,366,893 B2 | 4/2002 | Hannula et al. | |
| 6,519,571 B1 | 2/2003 | Guheen et al. | |
| 6,529,886 B1 | 3/2003 | Campana et al. | |
| 6,560,581 B1 | 5/2003 | Fox et al. | |
| 6,675,153 B1 | 1/2004 | Cook et al. | |
| 7,003,480 B2 | 2/2006 | Fox et al. | |
| 7,003,789 B1 | 2/2006 | Linehan | |
| 7,051,002 B2 | 5/2006 | Keresman, III et al. | |
| 7,058,611 B2 | 6/2006 | Kranzley et al. | |
| 7,089,208 B1 | 8/2006 | Levchin et al. | |
| 7,111,789 B2 | 9/2006 | Rajasekaran et al. | |
| 7,120,609 B1 | 10/2006 | Kerkdijk | |
| 7,133,645 B2 * | 11/2006 | Thermond | H01Q 1/007 455/67.7 |
| 7,133,646 B1 * | 11/2006 | Miao | 455/73 |
| 7,133,843 B2 | 11/2006 | Hansmann et al. | |
| 7,133,846 B1 * | 11/2006 | Ginter | G06F 21/00 705/54 |
| 7,191,151 B1 | 3/2007 | Nosek | |
| 7,237,117 B2 | 6/2007 | Weiss | |
| 7,249,094 B2 | 7/2007 | Levchin et al. | |
| 7,349,557 B2 * | 3/2008 | Tibor | G06K 9/00006 340/5.8 |
| 7,469,341 B2 | 12/2008 | Edgett et al. | |
| 7,499,889 B2 | 3/2009 | Golan et al. | |
| 7,546,944 B2 * | 6/2009 | Goldberg | G06Q 20/04 235/375 |
| 7,647,252 B2 | 1/2010 | Rampell et al. | |
| 7,693,783 B2 | 4/2010 | Balasubramanian et al. | |
| 7,707,120 B2 | 4/2010 | Dominguez et al. | |
| 7,788,139 B2 * | 8/2010 | Rampell | G06Q 30/0207 705/26.1 |
| 7,966,259 B1 | 6/2011 | Bui | |
| 7,996,324 B2 | 8/2011 | Bishop et al. | |
| 8,140,429 B2 | 3/2012 | Balasubramanian et al. | |
| 8,271,395 B2 | 9/2012 | Dominguez et al. | |
| 8,396,810 B1 | 3/2013 | Cook | |
| 2001/0011256 A1 | 8/2001 | Hannula et al. | |
| 2001/0032878 A1 | 10/2001 | TSiounis | |
| 2001/0047054 A1 * | 11/2001 | Zopf | C08F 220/04 524/815 |
| 2001/0047334 A1 | 11/2001 | Nappe et al. | |
| 2002/0032616 A1 | 3/2002 | Suzuki et al. | |
| 2002/0042776 A1 | 4/2002 | Woo et al. | |
| 2002/0042781 A1 | 4/2002 | Kranzley et al. | |
| 2002/0103752 A1 | 8/2002 | Berger et al. | |
| 2002/0138287 A1 * | 9/2002 | Chen | G06Q 10/10 709/202 |
| 2003/0009382 A1 | 1/2003 | D'Arbeloff et al. | |
| 2003/0093372 A1 | 5/2003 | Atogi et al. | |
| 2003/0130958 A1 * | 7/2003 | Narayanan | G06Q 20/02 705/73 |
| 2003/0200172 A1 | 10/2003 | Randle et al. | |
| 2003/0233327 A1 | 12/2003 | Keresman, III et al. | |
| 2004/0002918 A1 | 1/2004 | McCarthy et al. | |
| 2004/0078328 A1 | 4/2004 | Talbert et al. | |
| 2005/0164739 A1 * | 7/2005 | Goldberg et al. | 455/558 |
| 2005/0177750 A1 | 8/2005 | Gasparini et al. | |
| 2005/0256802 A1 * | 11/2005 | Ammermann | G06Q 20/02 705/44 |
| 2006/0149665 A1 | 7/2006 | Weksler | |
| 2006/0234758 A1 | 10/2006 | Schleicher | |
| 2006/0282382 A1 | 12/2006 | Balasubramanian et al. | |
| 2008/0028228 A1 | 1/2008 | Mardikar et al. | |
| 2008/0033878 A1 * | 2/2008 | Krikorian | G06Q 20/02 705/44 |
| 2008/0103923 A1 * | 5/2008 | Rieck | G06Q 20/12 705/26.41 |
| 2008/0168544 A1 | 7/2008 | von Krogh | |
| 2008/0172341 A1 | 7/2008 | Crandell | |
| 2010/0153200 A1 | 6/2010 | Thomas | |
| 2010/0169215 A1 | 7/2010 | Balasubramanian et al. | |
| 2011/0047054 A1 * | 2/2011 | Ginter et al. | 705/30 |
| 2011/0167002 A1 | 7/2011 | Balasubramanian et al. | |
| 2011/0258090 A1 | 10/2011 | Bosch et al. | |
| 2012/0016728 A1 | 1/2012 | Ahmad et al. | |
| 2012/0116933 A1 | 5/2012 | Matthews et al. | |
| 2012/0197760 A1 | 8/2012 | Balasubramanian et al. | |
| 2013/0211934 A1 | 8/2013 | Balasubramanian | |

(56) References Cited

U.S. PATENT DOCUMENTS

| | | |
|---|---|---|
| 2014/0081863 A1 | 3/2014 | Balasubramanian |
| 2014/0089194 A1 | 3/2014 | Balasubramanian |
| 2014/0108250 A1 | 4/2014 | Balasubramanian |
| 2014/0156532 A1 | 6/2014 | Balasubramanian |

FOREIGN PATENT DOCUMENTS

| | | |
|---|---|---|
| EP | 1 134 707 A1 | 9/2001 |
| GB | 2360380 | 9/2001 |
| JP | 60-079466 | 5/1985 |
| WO | WO 93/04425 | 3/1993 |
| WO | WO 99/07121 | 2/1999 |
| WO | WO 00/01108 A | 1/2000 |
| WO | WO 01/18719 A1 | 3/2001 |
| WO | WO 01/18720 A1 | 3/2001 |
| WO | WO 01/26062 A1 | 4/2001 |
| WO | WO 01/46918 A2 | 6/2001 |
| WO | WO 01/78493 A3 | 10/2001 |
| WO | WO 01/80100 A1 | 10/2001 |
| WO | WO 01/82246 A | 11/2001 |
| WO | 02/25604 | 3/2002 |
| WO | WO 02/44976 A2 | 6/2002 |
| WO | WO 03/107242 A1 | 12/2003 |

OTHER PUBLICATIONS

Petition to Institute a Covered Business Method Patent Review under Section 18 of the Leahy-Smith America Invents Act and 37 C.F.R. Section 42.300 et seq. regarding U.S. Pat. No. 7,051,002 for Universal Merchant Platform for Payment Authentication, filed with the United States Patent and Trademark Office on Nov. 15, 2013.
Petition to Institute a Covered Business Method Patent Review under Section 18 of the Leahy-Smith America Invents Act and 37 C.F.R. Section 42.300 et seq. regarding U.S. Pat. No. 7,693,783 for Universal Merchant Platform for Payment Authentication, filed with the United States Patent and Trademark Office on Nov. 16, 2013.
Petition to Institute a Covered Business Method Patent Review under Section 18 of the Leahy-Smith America Invents Act and 37 C.F.R. Section 42.300 et seq. regarding U.S. Pat. No. 8,140,429 for Universal Merchant Platform for Payment Authentication, filed with the United States Patent and Trademark Office on Nov. 15, 2013.
Declaration of Jason Napsky in Support of Petitions for Covered Business Method Patent Review regarding U.S. Pat. No. 7,051,002, U.S. Pat. Nos. 7,693,783 and 8,140,429 for Universal Merchant Platform for Payment Authentication, on Nov. 13, 2013.
Declaration of Greg Wooten in Support of Petitions for Covered Business Method Patent Review regarding U.S. Pat. No. 7,051,002, U.S. Pat. Nos. 7,693,783 and 8,140,429 for Universal Merchant Platform for Payment Authentication, on Nov. 14, 2013.
Declaration of Sandeep Chatterjee, Ph.D. in Support of Petitions for Covered Business Method Patent Review regarding U.S. Pat. No. 7,051,002, U.S. Pat. Nos. 7,693,783 and 8,140,429 for Universal Merchant Platform for Payment Authentication.
Exhibit 1010 in Support of Petitions for Covered Business Method Patent Review regarding U.S. Pat. No. 7,051,002, U.S. Pat. Nos. 7,693,783 and 8,140,429 for Universal Merchant Platform for Payment Authentication, Soap Version 1.2, W3C Working Draft Jul. 9, 2001, http://www.w3.org/TR/2001/WD-soap12-20010709/.
Bürk, et al., "Value Exchange Systems Enabling Security and Unobservability," Elsevier Science Publishers, vol. 9, No. 8, Dec. 1990, pp. 715-721.
David Chaum, "Security Without Identification: Transaction Systems to Make Big Brother Obsolete," Communications of the ACM, vol. 28, No. 10, Oct. 1985, pp. 1030-1044.
David Chaum, "Achieving Electronic Privacy," Scientific American, vol. 267, No. 2, Aug. 1992, pp. 76-81.
Exhibit AW2 to the statutory declaration of Andrew Weller Jan. 15, 2009—Joint press release issued by Visa and other technology providers (Jun. 27, 2001).
Exhibit BB4 to the statutory declaration of Bahram Boutorabi Jan. 27, 2009—*An Introduction to Authentication* (GPayment white paper—2000-2002).
Exhibit BB5 to the statutory declaration of Bahram Boutorabi Jan. 27, 2009—*Authentication* (GPayment white paper—2000-2002).
Exhibit BB6 to the statutory declaration of Bahram Boutorabi Jan. 27, 2009—*Smart Payment Technology* (GPayment white paper—2000-2002).
Exhibit BB7 to the statutory declaration of Bahram Boutorabi Jan. 27, 2009—*Electronic Wallets: Past, Present and Future* (GPayment white paper—2000-2002).
Exhibit BB8 to the statutory declaration of Bahram Boutorabi Jan. 27, 2009—*Pseudo Card Nos.* (GPayment white paper—2000-2002).
Exhibit BB9 to the statutory declaration of Bahram Boutorabi Jan. 27, 2009—Cached version of www.gpayments.com (May 11, 2002).
Exhibit BB10 to the statutory declaration of Bahram Boutorabi Jan. 27, 2009—Presentation entitled ActiveAccess Overview (Nov. 22, 2001).
Exhibit BB11 to the statutory declaration of Bahram Boutorabi Jan. 27, 2009—GPayments paper outlining authentication products (May 29, 2002).
Exhibit BB13 to the statutory declaration of Bahram Boutorabi Apr. 7, 2009—*3-D Secure Vendor Forum* (Visa presentation—Nov. 2, 2000).
Exhibit BB14 to the statutory declaration of Bahram Boutorabi Apr. 7, 2009—*3-D Secure Payment Authorisation* (Visa presentation—Jan. 25, 2001).
Exhibit BB15 to the statutory declaration of Bahram Boutorabi Apr. 7, 2009—*3-D Secure Vendor Forum* (Visa presentation—Jan. 25, 2001).
Exhibit BB16 to the statutory declaration of Bahram Boutorabi Apr. 7, 2009—*3-D Secure Interoperability Center* (Visa presentation—Jan. 25, 2001).
Exhibit BB17 to the statutory declaration of Bahram Boutorabi Apr. 7, 2009—Wikipedia Plug-In article (as at Apr. 7, 2009).
Exhibit BB18 to the statutory declaration of Bahram Boutorabi Apr. 7, 2009—*ActivePayment* (GPayment presentation—Feb. 7, 2000).
Exhibit BB19 to the statutory declaration of Bahram Boutorabi Apr. 7, 2009—*Eliminating Payment Fraud* (GPayment presentation—Apr. 16, 2002).
Exhibit BB20 to the statutory declaration of Bahram Boutorabi Apr. 7, 2009—*Authentication and Payment in Asia Pacific* (GPayment presentation—May 2, 2002).
Exhibit BB21 to the statutory declaration of Bahram Boutorabi Apr. 7, 2009—*VeriSign Conference Call and Online Demonstration* (GPayments presentation—May 21, 2002).
Exhibit BB22 to the statutory declaration of Bahram Boutorabi Apr. 7, 2009—Cached version of www.cyota.com (Feb. 13, 2002).
Exhibit BB23 to the statutory declaration of Bahram Boutorabi Apr. 7, 2009—PC-EFTPOS website (as at Apr. 7, 2009).
Exhibit BB24 to the statutory declaration of Bahram Boutorabi Apr. 7, 2009—OCV Implementation Suggestions (Oct. 22, 1999).
Exhibit BB25 to the statutory declaration of Bahram Boutorabi Mar. 5, 2010—GPayments ActiveAccess Overview (Apr. 16, 2002).
Exhibit BB26 to the statutory declaration of Bahram Boutorabi Mar. 5, 2010—Screen captures from Visa-certified version of GPayments (May 23, 2002).
Exhibit BB27 to the statutory declaration of Bahram Boutorabi Mar. 5, 2010—Schedule of certification of ActiveMerchant and ActiveAccess (Jun. 12, 2002).
Exhibit BB28 to the statutory declaration of Bahram Boutorabi Mar. 5, 2010—Presentation given at Sun Microsystems (May 2002).
Hamann et al. "Securing E-Business Applications Using Smart Cards," IBM Systems Journal, 2001. vol. 40, No. 3, pp. 635-647. [Accessed May 29, 2013—ProQuest] http://search.proquest.com/docview/222422057.
Karpinski. "IBM Payment Software to Run Atop App Server," InternetWeek, Nov. 1999. No. 790, p. 9. [Accessed May 29, 2013—ProQuest] http://search.proquest.com/docview/226906024.

(56) References Cited

OTHER PUBLICATIONS

Kutler et al. "MasterCard, IBM Team Up for E-Wallet Distribution," American Banker, Sep. 15, 1999. vol. 164, No. 177. [Accessed May 29, 2013—ProQuest] http://search.proquest.com/docview/249853957.
Malhotra. "Wireless Group Makes Strides, Still Faces Obstacles," American Banker, Jun. 7, 2002. vol. 167, No. 109. [Accessed May 29, 2013—ProQuest] http://search.proquest.com/docview/249855144.
Stallings. "The SET Standard & E-Commerce," Dr. Dobb's Journal, Nov. 2000. vol. 25, No. 11, pp. 30-36. [Accessed May 29, 2013—ProQuest] http://search.proquest.com/docview/202722072.
"Payments Could Be a Gold Mine Standards Remain Overriding Issue, BITS Attempts to Unite Industry," Retail Delivery System News, Feb. 13, 1998. vol. 3, No. 3, p. 1. [Accessed May 29, 2013—ProQuest] http://search.proquest.com/docview/206583755.
European Search Report dated Feb. 13, 2014.
U.S. Appl. No. 14/176,570, filed Feb. 10, 2014.
U.S. Appl. No. 14/026,197, filed Sep. 13, 2013.
U.S. Appl. No. 14/026,209, filed Sep. 13, 2013.
U.S. Appl. No. 14/026,232, filed Sep. 13, 2013.
IBM & Microsoft Corp., "Web Services Framework", Apr. 11, 2001.
"/n Software's MPI Software", 2002 (no document available).
Abad-Peiro et al., "Designing a Generic Payment System", Nov. 26, 1996.
Bartolini et al., "Requirements for Automated Negotiation", Apr. 11, 2001.
Best, "WSWS Position Paper", Apr. 11, 2001.
Bettag, "Position Paper for W3C Workshop on Web Services", Apr. 11, 2001.
Bosworth, "Developing Web Services", Apr. 11, 2001.
Brown, "VeriSign Web Services Positioning Paper"., Apr. 11, 2001.
Brown, "Reliable Messaging", Apr. 11, 2001.
Camarena, "WebMethods Position on Web Services", Apr. 11, 2001.
Cutler, "Chevron Interest in Web Services Workshop", Apr. 11, 2001.
Daniels, "Web Services Position Paper", Apr. 11, 2001.
Derose, "Position Paper for the W3C WSDL Workshop", Apr. 11, 2001.
Dornfest, "Position Paper for W3C Workshop on Web Services", Apr. 11, 2001.
Douglas, "Infrastructure Requirements for Business-Class Web Services", Apr. 11, 2001.
Edgar, "W3C Web Services: a Position Paper for the W3C", Apr. 11, 2001.
Eisenberg, "W3C Web Services Workshop Position Paper: Preparing for the Web Services Paradigm", Apr. 11, 2001.
Evans, "Transaction Internet Protocol: Facilitating Distributed Internet Applications", Apr. 11, 2001.
Ferguson, "Web Services Architecture: Direction and Position Paper", Apr. 11, 2001.
Frolund, et al., "Transactional Conversations", Apr. 11, 2001.
Fuchs, "Commerce One Position Paper—Workshop on Web Services", Apr. 11, 2001.
Gartner, "W3C Web Services Workshop—Position Paper", Apr. 11, 2001.
Govindarajan et al., "Conversation Definitions: Defining Interfaces of Web Services" Apr. 11, 2001.
Govindarajan, et al., "Web Services Architecture Overview Paper", Apr. 11, 2001.
Guardalben, "W3C Web Services Workshop Position Paper", Apr. 11, 2001.
Gudgin, et al., "SOAP Version 1.2 Specification", Jul. 9, 2001.
Hale, "Content Management for Web Services", Apr. 11, 2001.
Hall, et al., "Web Services Workshop Intel Position", Apr. 11, 2001.
Ingham et al., "Position Paper on Web Transactions", Apr. 11, 2001.
Isaacson, "Web Services Workshop Position Paper", Apr. 11, 2001.
Iwasa, "Fujitsu Position Paper for Workshop on Web services", Apr. 11, 2001.
Jerbic, "Hewlett Packard Position Paper to the Worldwide Web Consortium Workshop on Web Services", Apr. 11, 2001.
Karakashian, "BEA Position Paper on the W3C Web Services Workshop", Apr. 11, 2001.
Karp, et al., "Advertising and Discovering Business Services", Apr. 11, 2001.
Ketchpel, et al., "U-PAI: A Universal Payment Application Interface", 1996.
Laskey, "Position Paper Regarding Web Services", Apr. 11, 2001.
Machiraju, "A Peer-to-Peer Service Interface for Manageability", Apr. 11, 2001.
Manes, "Enabling Open, Interoperable, and Smart Web Services: The Need for Shared Context", Apr. 11, 2001.
Mitra, "Ericsson contribution to the W3C Workshop on Web Services", Apr. 11, 2001.
Moberg, "Web Services, Synchronous Collaborations, and Solutions to Distributed Process Coordination Problems Reflecting Legacy Integration Latencies", Apr. 11, 2001.
Morciniec, et al., "Towards the Electronic Contract", Apr. 11, 2001.
Moreau et al., "Using XML for Describing Web Services", Apr. 11, 2001.
Mullins, "Web Services Workshop Position Paper", Apr. 11, 2001.
Newcomer, et al., "Web Services Definition Position Paper", Apr. 11, 2001.
Nielsen, "SOAP Addressing and Path Modeling", Apr. 11, 2001.
Nottingham, "Web Service Scalability and Performance with Optimising Intermediaries", Apr. 11, 2001.
Ogbuji, "Position Paper for W3C Workshop on Web Services", Apr. 11, 2001.
Orchard, "Jamcracker W3C Web Services Workshop Position Paper ", Apr. 11, 2001.
Prud'Hommeaux, Eric, "Semantic Web Position Paper", Apr. 11, 2001.
Reagle, Jr., XML Security:, Apr. 11, 2001.
Reed, "Requirements for a Global Identity Management Service", Apr. 11, 2001.
Sabbouh, et al., "Interoperability: Workshop on Web Services", Apr. 11, 2001.
Sankar, WebServices Framework & Assertion Exchange using SAML Apr. 11, 2001.
Scott, "The Road to Web Services", Apr. 11, 2001.
Seaborne et al., "A Framework for Business Composition", Apr. 11, 2001.
Sedukhin, "Platform for Assembly, Orchestration, and Management of Web Services", Apr. 11, 2001.
Service Real Authentication Data Storage, Aug. 14, 2002.
Sormunen, "Position Paper to W3C Forum WorkShop Web Services", Apr. 11, 2001.
Srivastava, "Oracle Dynamic Services: Oracle's Web Services Framework", Apr. 11, 2001.
Tauber, "Protocol for Accessing RDF-Based Registries", Apr. 11, 2001.
Tenenbaum et al., "Eco System: An Internet Commerce Architecture", May 1997.
Thatte, "Message Exchange Protocols for Web Services", Apr. 11, 2001.
Thompson, "Web Services—Beyond HTTP Tunneling", Apr. 11, 2001.
Verified by Visa (VbV) Protocol, 2001.
Virdhagriswaran, et al., "Two Level Architecture for Web Service Interactions", Apr. 11, 2001.
Whitmer, "Web Services for Clients", Apr. 11, 2001.
Wiechers, "SAP Position Paper", Apr. 11, 2001.
Winer, "UserLand's Position on Web Services", Apr. 11, 2001.
Zilles et al., "Position paper", Apr. 11, 2001.
Gpayments: Visa 3-D Secure vs. MasterCard SPA, Mar. 1, 2002, pp. 1-37.

* cited by examiner

ALTERNATIVE PAYMENT IMPLEMENTATION FOR ELECTRONIC RETAILERS

This application claims the benefit of U.S. Provisional Application No. 61/058,449, filed Jun. 3, 2008, incorporated herein by reference in its entirety.

TECHNICAL FIELD

The present disclosure generally relates to methods and/or systems for processing electronic payments. In particular, the disclosure is directed to methods and/or systems that provide authentication support and/or other payment processing solutions for electronic retailers (eTailors) conducting business over a telecommunications network, e.g., the Internet and wireless networks. However, it is to be appreciated that the presently disclosed subject matter is equally amenable to other like applications and/or environments.

INCORPORATION BY REFERENCE

U.S. Pat. No. 7,051,002, the disclosures of which are incorporated herein by reference, is mentioned.

BACKGROUND

By way of background, Internet commerce, or e-commerce as it is otherwise known, relates to the buying and selling of products and services between consumers and merchants over the Internet or other like transactional exchanges of information. The convenience of shopping over the Internet has sparked considerable interest in e-commerce on behalf of both consumers and merchants. Internet sales, or like transactions, have been typically carried out using standard credit cards such as Visa, MasterCard, Discover, American Express, or the like, or standard debit cards, i.e., check cards or automated teller machine (ATM) cards which directly access funds from an associated deposit account or other bank account.

While widely used for more traditional face-to-face transactions, use of these standard cards in connection with e-commerce presents certain difficulties, including difficulties concerning authentication or positive identification of the cardholder. These difficulties are evident in view of increasing reports of fraud and identity theft and have led to a deterioration of consumer confidence in the security of their personal information. The resulting apprehension has been further fueled by consumer uncertainty as to the reputation and integrity of a merchant with whom the consumer is dealing. Naturally, this poses a problem for merchants because the willingness of consumers to purchase goods or services electronically is inversely proportional to the apprehension they may have about the safety of their personal information.

In lieu of these difficulties, many merchants have turned to alternative payment providers, such as Paypal and Google, which offer the prospect of greater security for both merchants and consumers. Alternative payment providers further remove the merchants and the consumers from potential fraud and allow any fraudulently obtained funds to be more readily recovered. In essence, alternative payment providers provide another layer of protection against fraud. Consequently, it should come as no surprise that alternative payment providers have the perception of being more secure for online purchases than credit cards and debit cards.

However, each alternative payment provider has its own alternative payment implementation, with its own processing flow, message formats, response codes and communication protocols. While alternative payment providers often ensure participating merchants that fraudulent transactions and other charge backs, as they are known in the art, will not be the merchants' responsibility, this assurance is conditioned on the merchants properly implementing the alternative payment implementation. And, to the extent alternative payment implementations change, merchants are responsible for updating their system. Furthermore, typical integration with an alternative payment provider uses resources, i.e., computing power, memory, data storage capacity, etc., merchants would otherwise prefer to devote to other tasks. Often, the plug-in component can be extremely large and/or cumbersome to implement on a merchant's server. Thus, as should be apparent, there are considerable burdens placed upon merchants to properly implement the unique alternative payment implementations of each alternative payment provider. And, insofar as a merchant wishes to use several alternative payment options offered by a plurality of alternative payment providers, these burdens increase that much more.

The present invention contemplates a new and improved system and/or method to overcome the above-referenced difficulties and others.

BRIEF DESCRIPTION

In accordance with one aspect of the present invention, a method of processing a transaction between a merchant and a buyer over a communications network is provided. The transaction uses one of a plurality of alternative payment options, and each of the plurality of alternative payment options are provided by one of a plurality of alternative payment providers. Each of the plurality of alternative payment providers has different alternative payment implementations. The method includes obtaining transaction information from the merchant. The transaction information identifies which alternative payment option is being used. The method further includes returning a redirection URL and a payment network routable order identifier to the merchant. The redirection URL is dependent upon the identified alternative payment option. The method further includes obtaining a transaction message from the merchant. The transaction message is formatted with a unified message format and includes an operation type. The method further includes performing the operation type specified in the transaction message with the alternative payment provider corresponding to the identified alternative payment option and returning a processing message to the merchant containing results from performing the operation type specified in the transaction message. The processing message is formatted with the unified message format.

In accordance with another aspect of the present invention, a system for supporting the processing of transactions between merchants and consumers over a communications network is provided. The consumers each use one of a plurality of alternative payment options and each of the plurality of alternative payment options are provided by one of a plurality of alternative payment providers. Each of the plurality of alternative payment providers has different alternative payment implementations. The system includes a merchant layer for exchanging communications with the merchants. The merchant layer receives transaction information and an operation type for each transaction. The transaction information includes payment information and identifies the alternative payment option being used for each transaction. The system further includes a plug-in layer including a plurality of plug-in components. Each of the plurality of plug-in component administers a different one of the plurality of alternative payment providers in accordance with the respective alternative payment implementation. The system further includes a logic layer residing between the m layer and the plug-in layer. The logic layer is adapted to route communications between the merchant layer and selected plug-in components in the plug-in layer. The operation type and the transaction information for each transaction are routed to the plug-in component responsible for administering the alternative payment option associated with the transaction information. The logic layer is further adapted to return a redirection URL and a payment network routable order identifier to the merchants for each transaction.

In accordance with yet another aspect of the present invention, a system for processing a transaction between a merchant and a consumer over a communications network is provided. The transaction uses one of a plurality of alternative payment options. Each of the plurality of alternative payment options are provided by one of a plurality of alternative payment providers. Each of the plurality of alternative payment providers has different alternative payment implementations. The system includes means for obtaining transaction information from the merchant. The transaction information identifies the alternative payment options being used. The system further includes means for returning a redirection URL and a payment network routable order identifier to the merchant. The redirection URL is dependent upon the identified alternative payment option. The system further includes means for obtaining a transaction message from the merchant. The transaction message is formatted with a unified message format and includes an operation type. The system further includes means for performing the operation type specified in the transaction message with the alternative payment provider corresponding to the identified alternative payment option. The system further includes means for returning a processing message to the merchant containing results from performing the operation type specified in the transaction message. The processing message is formatted with the unified message format.

Numerous advantages and benefits of the present invention will become apparent to those of ordinary skill in the art upon reading and understanding the present specification.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

For clarity and simplicity, the present specification shall refer to structural and/or functional network elements, entities and/or facilities, relevant standards, protocols and/or services, and other components that are commonly known in the art without further detailed explanation as to their configuration or operation except to the extent the same has been modified or altered in accordance with and/or to accommodate aspects of the present invention.

An alternative payment provider provides an alternative payment option. Alternative payment providers include, but are not limited to, Google, PayPal, Bill Me Later, MyeCheck, Secure Vault Payments, and other alternative providers. Alternative payment options include, but are not limited to, Google Checkout and PayPal Express, which, as should be apparent, are provided by Google and PayPal, respectively. Additionally, it is also contemplated that an alternative payment provider may provide more than one alternative payment option. For example, the alternative payment provider Bill Me Later provides the following alternative payment options: Bill Me Later Express and Bill Me Later Business.

Each alternative payment provider has its own unique alternative payment implementation, which includes, but is not limited to, a processing flow, response codes, communications protocols, message formats. PayPal, for example, uses a processing flow that requires a transaction to be initiated by the merchant, whereby the merchant obtains a transaction ID. Using this transaction ID, the merchant then redirects the consumer to PayPal, where the consumer verifies the order. Upon verifying the order, the consumer is redirected to the merchant's website so the merchant can complete the transaction and provide the consumer with a receipt.

Figure 1:
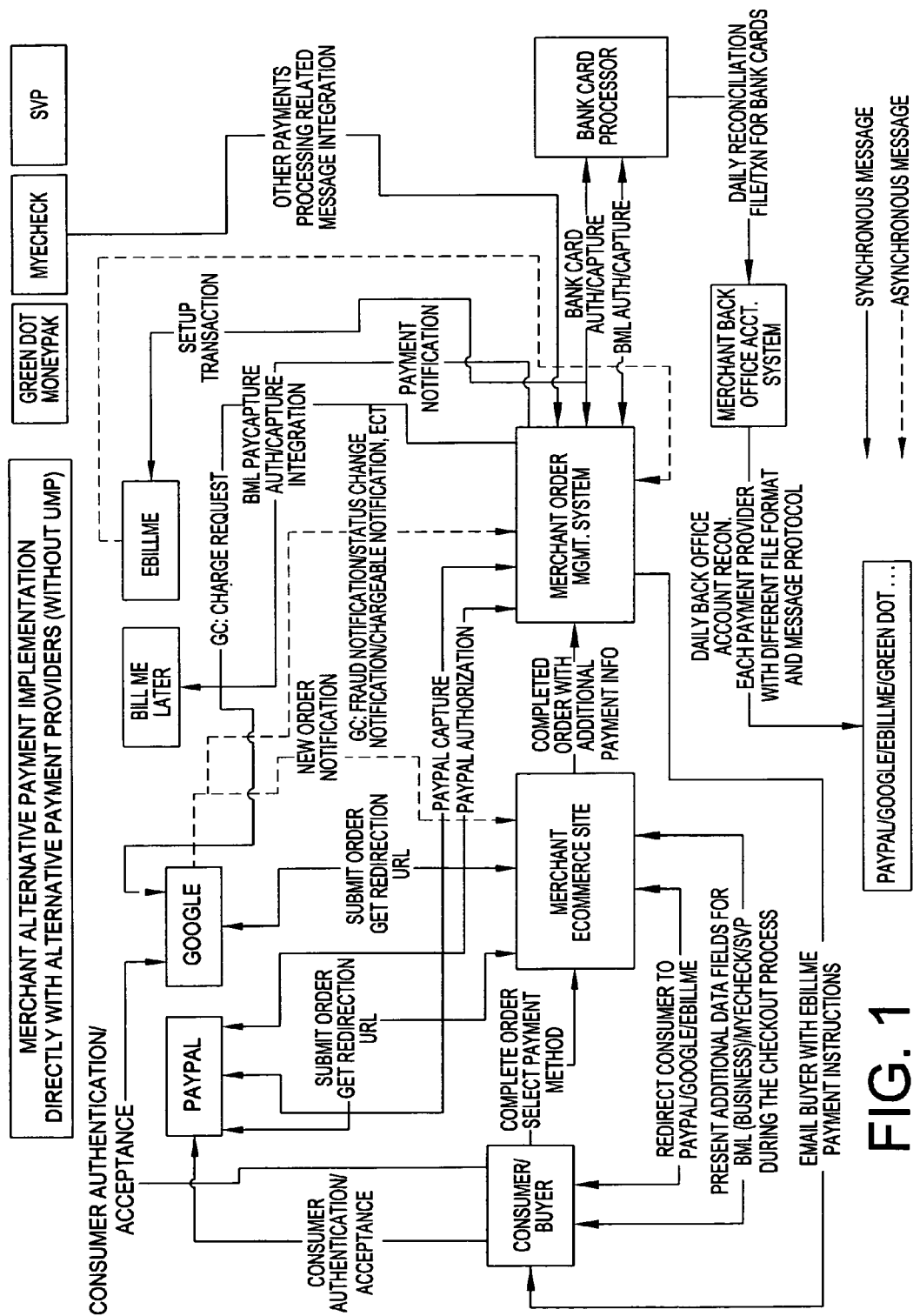
FIG. 1 is a diagrammatic illustration showing a prior art implementation that a merchant may employ to support one or more alternative payments via direct communication and/or interfacing with the alternative payment provider, e.g., such as PayPal, Google, etc.

In this regard, FIG. 1 is a diagrammatic illustration showing a prior art implementation that a merchant may employ to support one or more alternative payments via direct communication and/or interfacing with the alternative payment provider, e.g., such as PayPal, Google, etc.

With reference now to FIG. 1 it is noted that the illustrated flow presents an example of all the message integration that is employed for a merchant integrating with one or more alternative payment brands. For the sake of simplicity, the flow provides only details related to PayPal, GoogleCheckout, BillMeLater and eBillMe. Typically, every alternative payment has the following components: consumer acknowledgement (authentication), reserving funds and moving funds from the buyer to the seller. Generally, each alternative payment provider provides their own message format and communication/message exchange protocol.

As discussed above, payment implementations are very burdensome for a merchant to implement. This is even more so when a merchant wishes to implement multiple alternative payment implementations. In accordance with the preferred embodiment, the present invention serves as a centralized merchant processing system for alternative payment options (herein referred to as the universal merchant platform (UMP)). The UMP processes transactions from one or more merchants, where each transaction processed by the UMP uses one of a plurality of alternative payment options supported by the UMP.

The UMP advantageously allows a merchant to securely and easily process consumer transactions using any one of a plurality of alternative payment options by offloading the processing of the transaction to the UMP. In this manner, only the maintainer of the UMP needs to worry about implementing and maintaining the various alternative payment implementations. The UMP further enables merchants to handle these transactions regardless of which alternative payment implementation is being used by using a common payment implementation. Namely, the merchant need only implement the payment implementation called for by the UMP.

Figure 2:
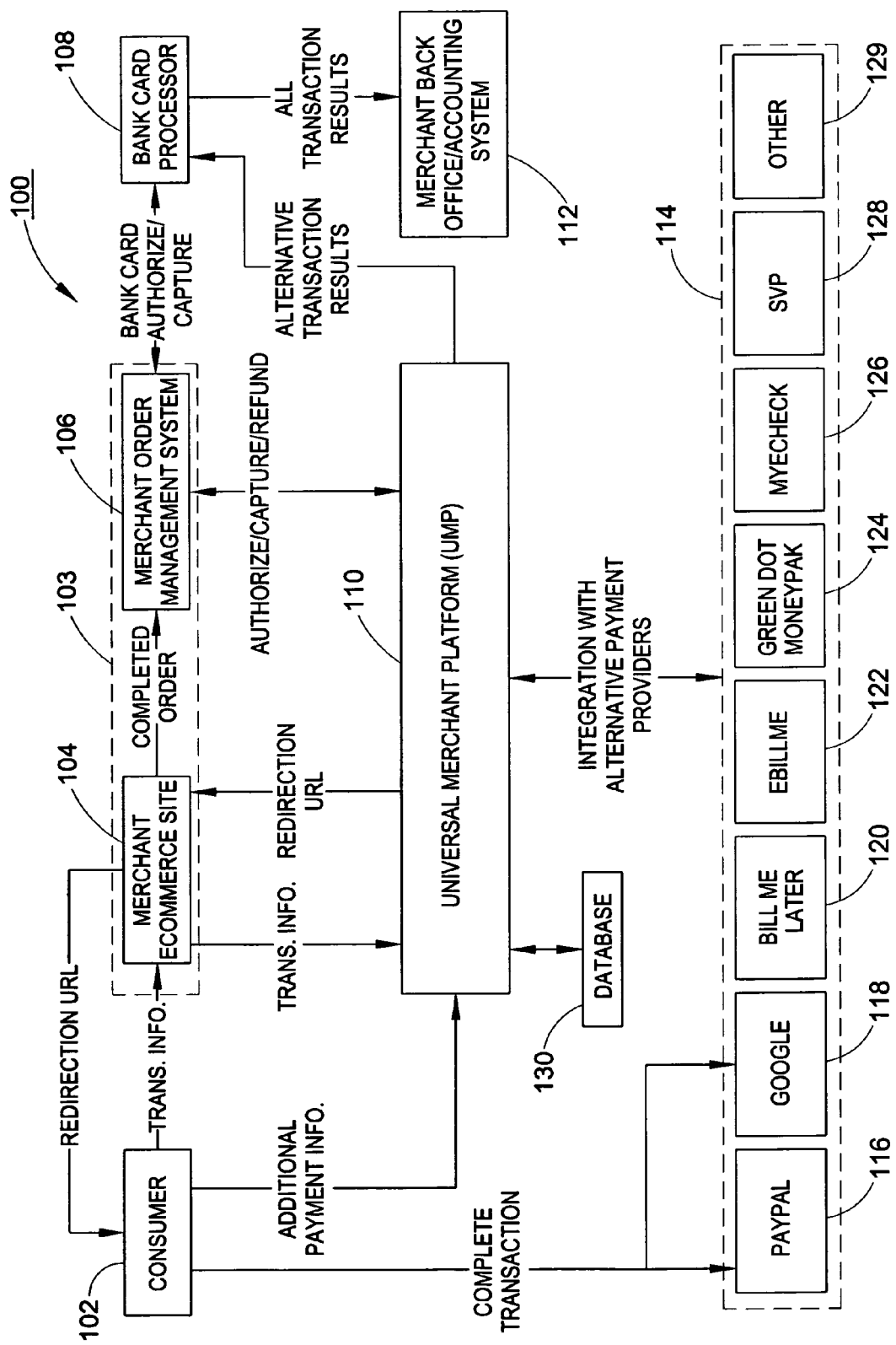
FIG. 2 is a diagrammatic illustration showing an exemplary implementation that a merchant may employ to support one or more alternative payment options via a universal merchant platform.

With reference to FIG. 2, a diagrammatic illustration of an exemplary system 100 that a merchant 103 may employ to support one or more alternative payment options 114 via a UMP 110 is shown. The system 100 includes, but is not limited to, a consumer 102, the merchant 103, a bank card processor 108, the UMP 110, a merchant back office accounting system 112, a database 130, and alternative payment providers 114. The consumer 102 will generally be the average web user browsing the internet on their home computer with a standard web browser, e.g., Firefox. The consumer 102 may also be using a mobile telephone or personal digital assistant (PDA) with internet and/or short message service (SMS) capabilities. However, the consumer 102 may also take other forms, such as, but not limited to, governments and companies acting through their employees. The merchant 103 generally refers to the average electronic retailer with an internet website operative to allow the consumer 102 to purchase goods and/or services electronically, e.g., Amazon or CDW. The merchant 103 includes, but is not limited to, a merchant website 104 and a merchant order management system 106. The merchant website 104 is the frontend which the consumer 102 interacts with while performing a transaction with the merchant 103. The order management system 106 processes the orders for the merchant 103 that the consumer 102 submits on the merchant website 104. The merchant 103 may optionally include a merchant back office accounting system 112, which, as its name would suggest, is responsible for verifying internal records kept by the merchant order management system 106 match the transaction results from the UMP and any other payment providers. The bank card processor 108 allows the merchant 103 to accept bank cards, such as credit cards and debit cards, as a payment option for consumers 102. Among others, National Bankcard Inc. provides such services. Additionally, or in the alternative, the bank card processor 108 is operative to process and format alternative payment transaction results from the UMP 110. The UMP 110 provides a bridge between a uniform alternative payment implementation and the individual alternative payment implementations called for by the alternative payment providers supported by the UMP 110. The database 130 provides the UMP with storage for transaction information and may be external or internal to the UMP 110. The database 130 may be a MySQL, MSSQL, Oracle, Microsoft Access, or other database. Alternative payment providers provide the alternative payment options accepted by the merchant 103 and include, but are not limited to, PayPal 116, Google 118, Bill Me Later 120, eBillMe 122, Green Dot MoneyPak 124, MyeCheck 126, SVP 128, and other alternative payment providers 129.

Additionally, FIG. 2 shows the general flow of messages between the merchant 103, the consumer 102, the UMP 110, the alternative payment providers 114, the bank card processor 108 and the merchant back office system 112. The following discussion will track the general flow of messages between these components of the system 100 and elaborate on the role of the components in the system 100.

Tracking the flow of a transaction within the system 100 of FIG. 2, the transaction beings with the consumer 102. As is commonly known, consumers 102 generally browse a merchant's site 104 and add items they wish to purchase into a shopping cart. Once a consumer 102 has finished browsing the retailer's website 104, the consumer 102 has the option to view the items within their shopping cart and checkout. If the consumer chooses to checkout, the consumer 102 is thereafter prompted to enter additional information, including, but not limited to, payment information and shipping information. Under the preferred embodiment of the present invention, the consumer 102 has the option of selecting any one of a plurality of alternative payment options which are supported by the UMP 110, such as PayPal Express. The consumer 102 may further have other payment options, such as paying with a credit card or a debit card. As shown in FIG. 2, the merchant 103 is integrated with a bank card processor 108 that provides the consumer 102 the option of paying with a debit card.

After the consumer 102 finishes entering this additional information the transaction information is sent to the merchant 103. Transaction information (e.g., HTML, SMS) collectively refers to, inter alia, the payment information, order information and shipping information. Additionally, order information general comprises the line items of the shopping cart. However, order information may alternatively refer to the shopping cart total. Upon receiving the transaction information, the merchant 103 determines the payment option selected by the consumer 102 and what action to take. If the consumer 102 selected an alternative payment option, the merchant 103 forwards the transaction information to the UMP 110 for further processing. Otherwise, the merchant 103 takes the appropriate steps to process the selected payment option locally. And, if additional information is unnecessary to process the transaction locally, the merchant 103 may prompt the consumer 102 to confirm the order, whereby the consumer 102 can complete the transaction.

Once the UMP 110 obtains the transaction information from the merchant 103, the UMP 110 may optionally check to see if the selected alternative payment option is available. This is useful because if an alternative payment provider experiences technical difficulties such that their services are unavailable, it is advantageous to fail gracefully instead of providing the consumer 102 with an error message, such as a "404 not found message." Thus, by checking the availability of an alternative payment provider 114 before the transaction proceeds further, the UMP 110 can notify the merchant 114 of the unavailability of the alternative payment provider 114, and the merchant 110 can prompt the consumer 102 to select a different payment option. Additionally, the UMP 110 can disable the alternative payment option for other merchants 103.

Assuming the selected alternative payment provider 114 is available, the UMP 110 provides the merchant 103 with a payment network routable order identifier that uniquely identifies the transaction to the merchant 103. The merchant 103 uses the order identifier throughout the lifecycle of the transaction. The transaction lifecycle includes, but is not limited to, payment authorization, payment capture, refund, and cancellation. The order identifier is preferably a Mod 10 compliant 16 digit number and may further be prefixed with specific digits to enable easier decision processing logic implementation within the merchant order management system 106. Additionally, the order identifier is preferably specific to the merchant 103, such that two different merchants 103 may have the same order identifier.

The UMP 110 further provides the merchant 103 with a redirection URL and a token. The redirection URL varies depending upon the alternative payment option selected by the consumer 102 and serves to facilitate at least one of two functions: collecting additional payment information from the consumer 102; or getting consumer authentication. Some alternative payment providers 114 use an alternative payment implementation that requires the consumer 102 to directly authenticate and enter additional information with the alternative payment provider 114. The token serves to identify the transaction.

In order to maintain a relationship between all the transaction information collected during the lifecycle of a transaction, the UMP 110 includes the database 130 to save the transaction information. As should be appreciated, database is being used loosely. A database may be a traditional database such as a database provided by MySQL, or it may simply be a data structure stored within the memory of the UMP 110. However, regardless of how the information is stored, it is of particular importance that the database 130 stores a merchant identifier, e.g., the merchant's name, the order identifier and the token for each transaction. The database 130 also stores information about the merchants registered to use the UMP 110. Among other things, this information includes a return redirection URL and a merchant identifier.

Upon receiving the redirection URL and token from the UMP 110, the merchant 103 redirects the consumer 102 with the token and the redirection URL. The token identifies the transaction to the party the consumer 102 is redirected to. Under the preferred embodiment, the merchant 103 redirects the consumer 102 with a concatenation of the redirection URL and the token, where the token is appended to the end of the redirection URL as part of a query string. The party to which the consumer 102 is redirected need only read the query string to identify the transaction. However, other methods are also contemplated for transferring the token to the party which the consumer 102 is redirected to. One such method being form posts.

If the redirection URL is used to collect additional payment information from the consumer 102, the redirection URL points to the UMP 110 and the UMP 110 generates the token. The UMP 110 prompts the consumer 102 to enter additional payment information that is specific to the alternative payment provider 114 being used. BillMeLater (BML), for example, demands the collection of up to 40 different data elements, including, but not limited to, EIN, salary, and the number of years the BML business user has worked at the company. MyeCheck, on the other hand, demands the collection, inter alia, of the consumer's driver license no., state, ABA and account number. After entering the additional payment information, the UMP 110 validates and stores the additional payment information in the database 130.

Upon collecting this additional payment information from the consumer 102, the consumer 102 is redirected back to the merchant's website 104. The UMP 110 knows where to redirect the consumer 102 because the token allows the UMP 110 to find the record associated with the transaction in the database 130. This, in turn, allows the UMP 110 to recover the merchant identifier for the transaction. With the merchant identifier, the UMP 110 is able to lookup the registration record in the database for that particular merchant 103. As mentioned above, the merchant 103 initially registers with the UMP 110 and provides a return redirection URL which is stored in the database 130. Thus, UMP 110 is able to retrieve a return redirection URL from the database 130. Alternatively, the merchant may simply provide the UMP with a return redirection URL prior to the initial redirection, such that there is no need for storing registrations.

Naturally, because the consumer 102 left the merchant's website, it may also be necessary for the consumer 102 to provide identification to merchant 103 on return redirection. In the exemplary embodiment the consumer 102 identifies itself to the merchant's website 104 using the order identifier assigned to the transaction. As with the redirection URL and the token, the order identifier is preferably appended to the return redirection URL as part of a query string. Because the UMP 110 stored the token and order identifier in the database 130, and the UMP 110 knows what token is associated with the transaction, the UMP 110 is able to make a mapping between the token and the order identifier by simply searching the database 130 for the token. Notwithstanding the ability to use a query string to transfer the order identifier, form posts may also be used to identify the consumer 102 to the merchant 103. Alternatively, session variables may also be appropriate for identifying the consumer to the merchant, such that the consumer 102 does not even need to provide the order identifier to the merchant 103.

When the redirection URL is being used to get consumer authentication, the redirection URL generally points to the alternative payment provider associated 114 with the transaction. The UMP 110 knows where to redirect the consumer 102 because the redirect URL is part of the alternative payment implementation, which the UMP 110 implements. With reference to FIG. 2, PayPal 116 and Google 118 are examples of alternative payment providers 114 that require direct consumer authentication. Once the consumer 102 has been redirected to the alternative payment provider 114, the consumer 102 logs in and enters any additional information called for by the alternative payment provider 114. The consumer 102 may further be asked to verify the order information. Upon completing any tasks called for by the alternative payment provider 114, the consumer 102 is redirected to the merchant's website 104 and the transaction proceeds towards completion. However, unlike the process above described for collecting additional payment information, the token and return redirection URL are determined differently.

Alternative payment providers that require consumer authentication, such as PayPal 116 and Google 118, require the transaction to be initiated with the alternative payment provider 114 prior to returning a redirection URL. This encompasses the UMP 110 providing the alternative payment provider 114 with transaction information in exchange for a token; this is the token returned to the merchant 103. Additionally, the UMP 110 provides the alternative payment provider 114 with a return redirection URL. As is done when collecting additional payment information, the UMP 103 preferably retrieves the return redirection URL from the database and preferably concatenates it with a query string containing the order identifier. As mentioned, the order identifier identifies the consumer 102 to the merchant 103 upon return redirect. However, alternative means of identifying the consumer 102 to the merchant 103 may be sufficient, e.g., session variables.

Once the consumer 102 is redirected back to the merchant 103, the merchant 103 submits the completed order to the order management system 106 for processing. Among other things, the order management system 106 is provided with the order identifier. As established above, the merchant 103 receives the order identifier as part of the return redirection URL, or alternatively recovers it from other means, such as session variables or form posts. Additionally, the order management system is provided with the amount of the transaction. Because this is not present in the return redirection URL, the merchant 103 must maintain an internal database between order identifiers and transaction information. Alternatively, the merchant 103 may recover the information from the UMP 110 or session variables.

The order management system 106 instructs the UMP 110 to complete the transaction once it receives the completed order. To accomplish this, the order management system 106 sends a transaction message to the UMP 110. The transaction message generally includes the order identifier, operation type and amount. The operation type is generally one of authorize/capture and refund. As one should appreciate, authorize and capture are separate and distinct. However, because they are generally used in unison, they will be grouped for the duration of this discussion. The transaction message is further formatted with a common messaging format. This allows a merchant 103 to use a single message format for any of the alternative payment options. The UMP 110 does any needed translation between the common message format and the message format called for by the alternative payment provider 114.

Upon receiving a transaction message, the UMP 110 performs one of the following: processes the message real-time or defers processing the messages for batch processing. Batch processing advantageously allows the UMP 110 to process several transactions with an alternative payment provider 114 at the same time. Among other reasons, this is important when the UMP 110 has limited connectivity to the alternative payment provider 114. However, notwithstanding the advantages of batch processing, the determination on whether to process transaction as part of a batch process depends largely on whether the alternative payment provider 114 associated with the message supports batch processing.

If batch processing is not appropriate, the UMP 110 immediately performs the operation type requested by the merchant 110 for the given order identifier. Because the UMP 110 stored all the transaction information during the preceding steps, it has all of the required information necessary to complete the transaction. Accordingly, the UMP 110 determines which alternative payment provider 114 is associated with the provided order identifier. Upon making this determination, the UMP 110 performs the operation type specified in the transaction message according to the specific implementation required by the alternative payment provider 114 associated with the determined alternative payment option.

The UMP 110 takes all the required information and formats it according to the specific message formats called for by the alternative payment provider 114. Moreover, the UMP 110 translates the operation type into the corresponding messages used by the alternative payment provider 114. Thereafter, the UMP 110 completes the transaction using the communication protocols required by the alternative payment provider 114. This encompasses handling both synchronous and asynchronous messages, as necessary. In the case of asynchronous messages, the UMP 110 queues the messages for synchronous processing. Google Checkout, for example, generates approximately 10 asynchronous notifications during a typical transaction. Moreover, the UMP 110 may also need to handle transaction chaining. Namely, some alternative payment providers 114, such as PayPal 116, require communications to include identifiers obtained from preceding communications. Thus, in short, the UMP 110 handles all the processing activities related to payment provider message communications, transaction resolution monitors, splitting and bundling refund transactions, and synchronous and asynchronous message handling.

Upon completing the particular transaction called for by the merchant 103, the UMP 110 returns a processing message summarizing the results of the transaction. Additionally, assuming the transaction succeeds, the UMP 110 may return a payment receipt from the alternative payment provider 114 as part of the processing message. The processing message sent to the merchant 103 is formatted according to the unified message format used by the transaction messages.

As should be apparent to those skilled in the art, the foregoing discussion dealt primarily with a transaction message to transfer funds to the merchant, i.e., authorize/capture. Usually, this will be the end of the transaction. However, notwithstanding the above reference to completing the transaction, the transaction may not actually be completed. Rather, the transaction lifecycle may proceed to refunding the client. In such a case, the merchant 103 need only provide the UMP 110 with a transaction message containing the order identifier previously generated for the transaction and an operation type of refund.

Apart from processing transactions, the UMP 110 is also operative to facilitate back office accounting and daily reconciliation files. In such a case, the UMP provider is suitably partnered with one or more acquirers and processors, where that the UMP 110 provides transaction information to the one or more acquirers or processors. As shown in FIG. 2, the UMP 110 is partnered with a bank card processor 108. The processor provides the merchant 103 with all the alternative payment information in the same format used by other payment information. That is to say, transaction information from alternative payment options will be formatted in the same way as transaction information from other payment options, e.g., a bank card. This advantageously allows the merchant's existing back office reconciliation system 112 to recognize and perform the appropriate accounting processes without modification.

For merchant's that are using a processor that is incompatible with the UMP 110, the UMP 110 allows the merchant 103 to directly access daily summary reports for all supported alternative payment options. In such a case, customizations to the UMP back office format can be created to follow the format used by the merchant's other processors/acquirers. For example, the UMP back office format can be customized to match the back office format used by the merchant's bank card processor 108.

The UMP 110 may also advantageously provide merchants and the UMP provider with statistical information. Among other information, it is contemplated that the UMP 110 will track and report the number of users selecting alternative payment options, and whether the users complete or abandon the payment. Additionally, the UMP 110 may also track the time to complete a transaction and the average transaction amount. However, the foregoing examples are far from exhaustive, and it should be apparent to those skilled in the art that the UMP 110 may easily be modified to collect and report other statistical information.

Figure 3:
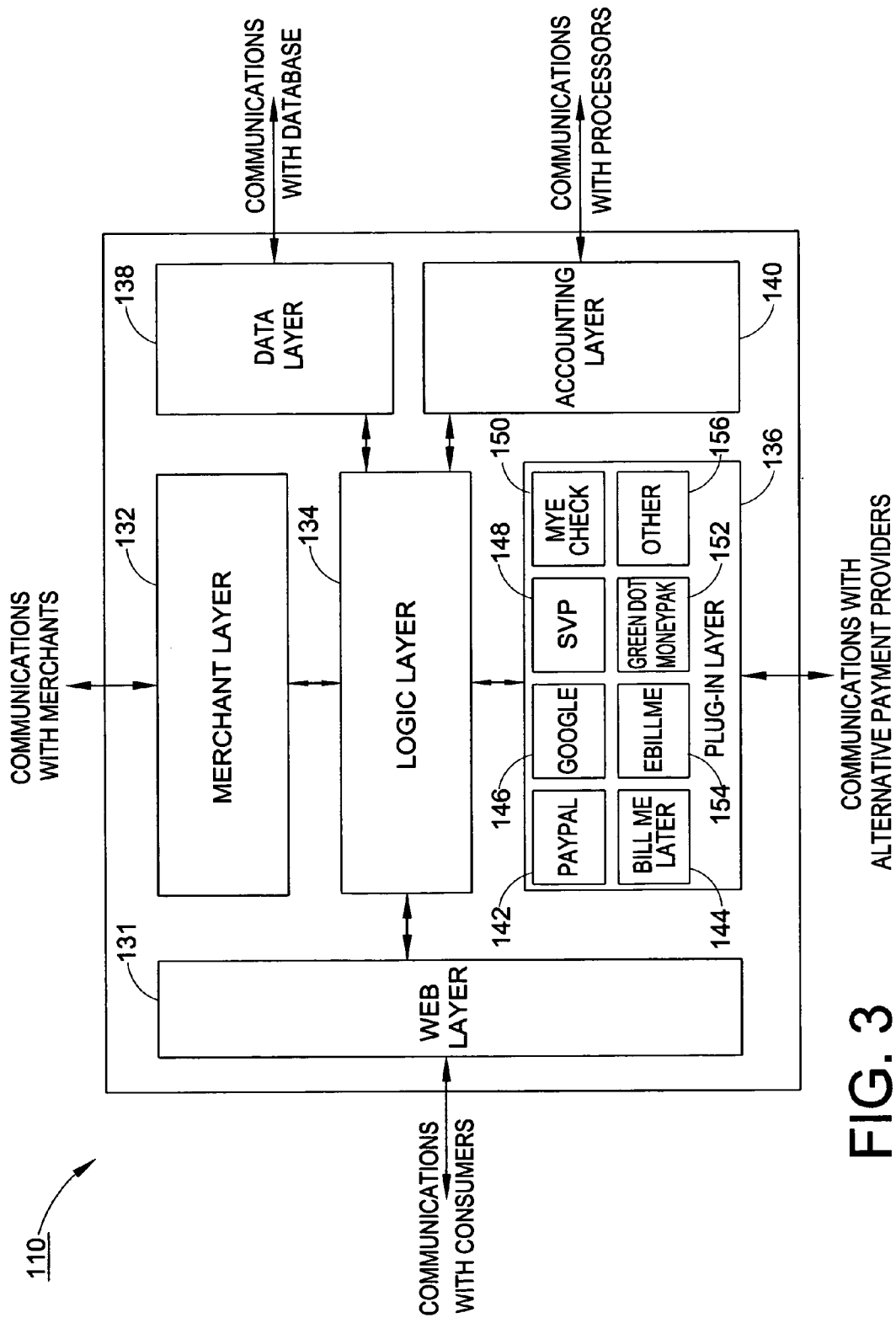
FIG. 3 is a diagrammatic illustration showing an exemplary universal merchant platform in accordance with aspects of the present invention.

With reference to FIG. 3, a diagrammatic illustration of an exemplary universal merchant platform 110 in accordance with aspects of the present invention is shown. The UMP 110 has been abstracted into 6 main components: a web layer 131, a merchant layer 132, a logic layer 134, a plug-in layer 136, a data layer 138 and an accounting layer 140. The web layer 131 collects additional payment information from the consumer 102. The merchant layer 132 communicates with the merchant 103. The logic layer 134 performs all the logic independent of which alternative payment provider is being used for the transaction. The plug-in layer contains all the logic specific to the alternative payment provider being used. The data layer 138 stores transaction information during the course of the transaction. The accounting layer 140 provides accounting information to the merchant 103 and/or processors, such as bank card processor 108. However, the foregoing layers are merely generalizations as to the specific roles of each layer, and each layer will be discussed in detail below. Moreover, it should be appreciated that individual layers making up the UMP 110 are only abstractions meant to help explain the UMP 110.

With respect to the plug-in layer 136, the plug-in layer 136 includes a plurality of plug-in components. As shown in FIG. 3, the plug-in layer 136 includes at least the following plug-in components: PayPal 142, Google 146, SVP 148, MyeCheck 150, Bill Me Later 144, eBillMe 154, Green Dot MoneyPak 152, and other plug-in components 156. Each plug-in component is operative to implement an alternative payment implementation of an alternative payment provider 114. That is to say, the plug-in component handles the message formats, communication protocols and response codes required by an alternative payment provider. Additionally, the plug-in component handles any synchronous and/or asynchronous communications received from an alternative payment provider 114. For example, the Google plug-in component 146 handles all asynchronous and synchronous messages received from Google 118 during the course of a transaction. Thus, the plug-in layer 136 contains all the logic specific to alternative payment providers 114.

As should be appreciated, the plug-in layer 136 allows the UMP 110 to disable a plug-in component if the corresponding alternative payment provider becomes unavailable. Moreover, the plug-in layer 136 allows the UMP 110 to be more readily maintained and expanded without disrupting service to the other alternative payment plug-in components. For example, when an alternative payment implementation is updated, all that needs to be modified is the plug-in component associated with the alternative payment implementation that has changed. Additionally, expanding support for additional alternative payment options is as simple is creating and/or installing a new plug-in component.

The web layer 131 serves to facilitate the collection of additional payment information. Namely, when the consumer 102 is redirected to the UMP 110, the web layer 131 provides the consumer 102 with a web interface to enter additional payment information. As described above, this additional payment information is specific to the alternative payment option being used for the transaction. Accordingly, the web layer 131 communicates with the plug-in component associated with the transaction to obtain the data fields which are specific to the alternative payment implementation associated with the transaction. The web layer 131 preferably creates the web interface dynamically from the obtained data fields. This advantageously allows additional plug-in components to be installed or existing plug-in components to be modified without having to modify the web layer 131.

With respect to the merchant layer 132, this is the layer that communicates with the merchants 103. Any number of interfaces may be provided for communications between the merchants 103 and the UMP 110, including, but not limited to, an HTTPS server, a direct connector, and an easy connector. The HTTPS server receives and/or sends HTTP messages, and communicates them to and/or from the logic layer 134. This connector is used by a thin-client to communicate with the UMP 110. The direct connector provides a Java interface that can be used by a merchant 103 integrating with the UMP 110 using the direct connection approach. This connector exposes the appropriate Java interfaces than can be used by the merchant 103 during integration. Messages received/sent using this connector are also communicated to/from the logic layer 134. The easy connector provides a web server that is used to communicate with the logic layer 134.

Implementing multiple connector types provides multiple ways for merchants 103 to integrate and participate within the various alternative payment providers 114. By providing multiple integration approaches, a wide variety of merchants 103 can be supported depending upon the merchant's 103 technical expertise, resource availability and transaction processing volume. That is to say, in addition to the thin-client approach, a direct connection and easy connection approach are also optional available to merchants 103.

The direct connection approach is provided for merchants 103 which insist on or otherwise want to host and manage the product, e.g., such merchants 103 may be high transaction volume merchants 103 and/or merchants 103 who have the technical resources to host and manage the product. The merchant 103 can use direct java calls to interface with the UMP 110 and communicate the appropriate messages. The direct connect interface is also available via a local socket server provided as part of the UMP 110. Merchants utilizing a software platform other than Java can use the local socket server. Under the direct connection approach the merchants provide their own hardware and/or software.

On the opposite end of the spectrum, the easy connection approach is provided as a software-less integration approach for merchants that do not wish to install the thin-client. Using the easy connect approach, the merchant 103 redirects the consumer 102 to the UMP 110 easy connect web server. The web server acts on behalf of the merchant's website 104 and communicates with the UMP 110 to provide the appropriate processing for the appropriate alternative payment implementation. Under this approach, the merchant 103 redirects the consumer 102 using HTTPS posts and receives the responses at a specified response URL. HTTP redirections are performed via the consumer's browser. Using the easy connection approach the merchant 103 may place an appropriate script after the transaction has been completed. The merchant receives the results at a URL specified within a response URL field designated in the script.

Somewhere between the direct approach and the easy connection approach, the thin-client approach is used for communicating transaction information between the merchant's website 104 and the UMP 110. The thin-client is not aware of the specific processing logic or protocols prescribed for by each alternative payment implementation. Suitably, the thin-client is a small software component installed on the merchant's 103 server, e.g., approximately 50 kilobytes in size. Merchants 103 use the thin client to securely communicate with the UMP 110. The thin client supports the following features: secure communication to the UMP 110, formatting data to the unified message format, and allowing merchants 103 to access response data.

The data layer 138 operates to store transaction information for use during the transaction lifecycle and beyond. As described above, the UMP 110 must collect transaction information over numerous steps before it can complete the transaction. Thus, it will generally be necessary to maintain transaction information for later use during the transaction lifecycle. The data layer 138 may store the data in any number of ways, as known in the art. Among other ways to store the information, the transaction information can be stored locally in a data structure in the UMP's 110 internal memory, files, or traditional databases, such as MySQL. Alternatively, the data layer may store the transaction information externally, as is shown in FIG. 2 with database 130. In such a case, the data layer 138 provides a standardized interface to the external database 130.

The accounting layer 140 serves to address functions related to the merchant's back office accounting system 112. Namely, the accounting layer 140 serves to provide the processors/acquirers associated with the UMP 110, such as bank card processor 108, with transaction information for all the transactions performed. The accounting layer 140 also serves to generate daily summary reports for merchants 103 that don't have a suitable processor, i.e., a processor incompatible with the UMP 110.

The logic layer 134 is the heart of the UMP 110 and serves primarily to connect all the aforementioned layers. The logic layer 134 distributes transaction messages from the merchants 103 to the plug-in component associated with the alternative payment option selected. The plug-in component then proceeds to perform the operation specified in the transaction message. In doing so, the plug-in component requests any transaction information necessary to complete the transaction from the logic layer 134, whereby the logic layer 134 fetches the requested information from the data layer 138 and returns it to the plug-in component.

The logic layer 134 also stores information obtained from the web layer 132 to the data layer 138 for later use. That is to say, when the consumer 102 is redirected to the web layer 131 to enter additional payment information specific to the alternative payment option associated with consumer 102, the logic layer 134 collects the information from the web layer 131 and stores it in the data layer 138. Additionally, the logic layer 134 is operative to retrieve the order identifier and return redirection URL from the data layer 138. These two items are needed to return the consumer 102 to the merchant website 104 after additional information has been collected on the web layer 131. Along these lines, the logic layer is also operative to store transaction information received from merchants 103. When the merchant layer 132 receives such information, the logic layer 134 stores it to the data layer 138 for later use.

Yet another important function of the logic layer 134 is to route messages to/from the accounting layer 140 from/to the data layer 138 and/or the merchant layer 132. For example, the logic layer 134 routes transaction information from the data layer 138 to the accounting layer 140. The accounting layer 140 needs the transaction information so it can provide transaction information to any processors/acquirers associated with the UMP 110. Additionally, the logic layer 134 routes requests for daily summary reports from merchants 103, received via the merchant layer 132, to the accounting layer 140. Thereafter, the logic layer 134 routes the corresponding response from the accounting layer 140 back to the merchant layer 132, where it is returned to the requesting merchant 103. As mentioned above, the daily summary reports may be requested directly from the UMP 110. This is generally used in situations where the merchant's processor is incompatible with the UMP 110.

Beyond bridging communications between the various layers of the UMP 110, the logic layer 134 also generates order identifiers, and in some cases tokens. When the order identifier is generated, the logic layer 134 stores it in the data layer 138 and returns it to the merchant 103 by way of the merchant layer 132. With respect to tokens, the logic layer 134 generates the tokens when the alternative payment option selected does not require the user to be directly authenticated with the alternative payment provider 114. Otherwise, the logic layer 134 requests the plug-in component associated with the alternative payment option initiate the transaction with the alternative payment provider 114 and return a token.

The logic layer 134 also returns the appropriate redirection URL: a URL to the UMP 110 or a URL to the alternative payment provider 114. If the alternative payment option requires the user to be authenticated on its site, the redirection URL is retrieved from the plug-in component associated with the transaction. Otherwise, the redirection URL points to the UMP 110.

As should be apparent from the foregoing discussion, the logic layer 134 acts primarily as a bridge to connect all the other layers. Furthermore, it implements most of the logic that is independent of the alternative payment provider being used for a transaction. However, it is important to note that the layers are only abstractions meant to help explain the inner workings of the UMP 110. Accordingly, any of the foregoing functions described in the layers may alternatively be implemented in other layers. Moreover, the foregoing discussion merely describes one embodiment for implementing the inventive features of the present invention. It is contemplated that other embodiments will be apparent to those skilled in the art.

Figure 4:
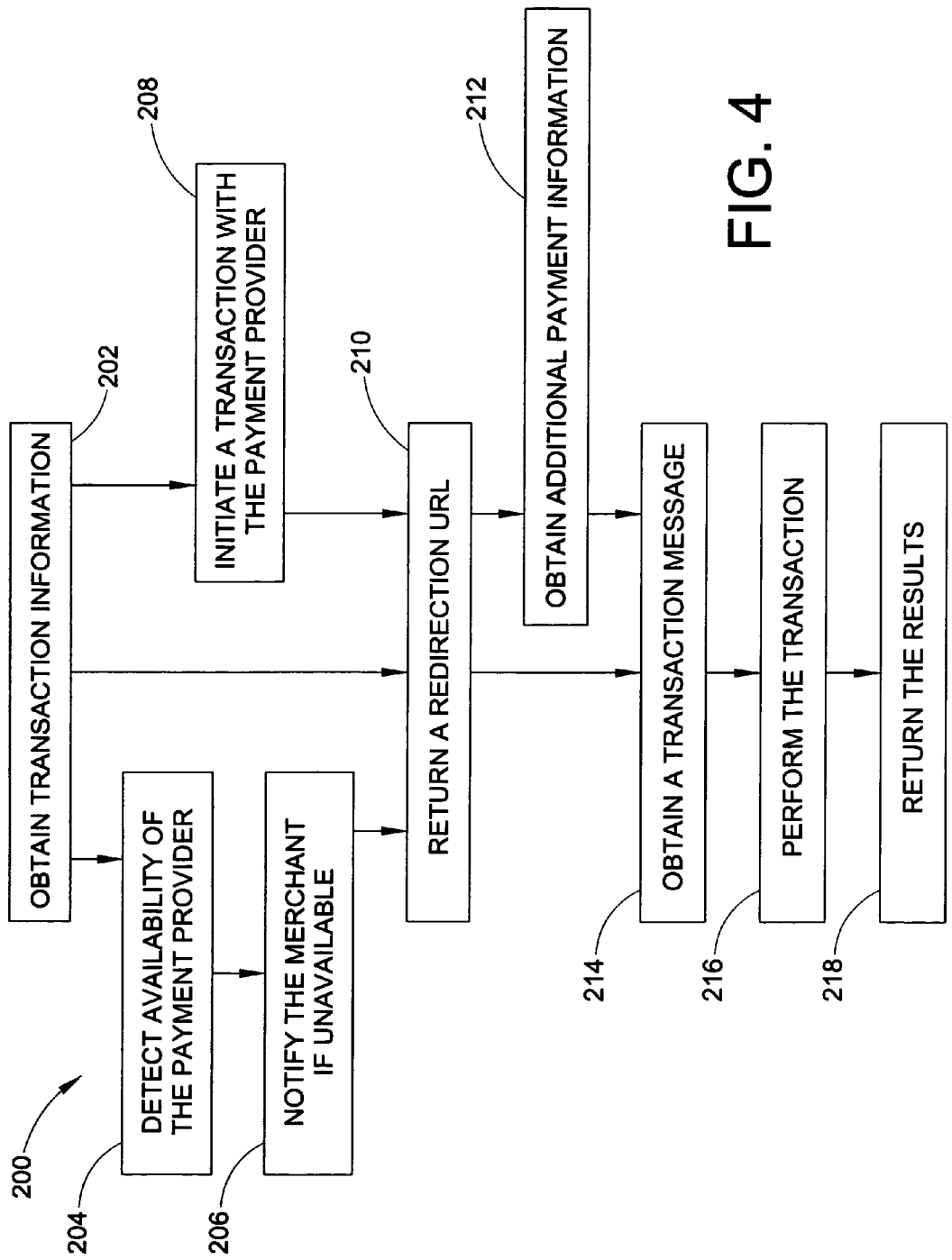
FIG. 4 is a flowchart illustrating an exemplary method for processing a transaction between a merchant and a buyer over a communications network, wherein the transaction is conducted using one of a plurality of alternative payment options.

With reference to FIG. 4, a flowchart illustrating an exemplary method 200 for processing a transaction between a merchant 103 and a consumer 102 over a communications network, from the perspective of the UMP 110, is provided. The transaction is conducted using one of a plurality of alternative payment options. The method includes the core steps of obtaining transaction information (Step 202), returning a redirection URL (Step 210), obtaining a transaction message (Step 214), performing the transaction (Step 216) and returning the results from performing the transaction (Step 218). The method optionally includes detecting the availability of an alternative payment provider (Step 204) and notifying the merchant if the alternative payment provider is unavailable (Step 206). Additionally, the method optionally includes initiating a transaction with the alternative payment provider (Step 208) or obtaining additional payment information (Step 212).

The first step is to obtain transaction information from the merchant 103 (Step 202). This transaction information includes, but is not limited to, payment information, order information and shipping information. The payment information includes the alternative payment option being used for the transaction. Additionally, as described above, this information is stored for use later during the life cycle of the transaction.

After obtaining the transaction information (Step 202), the UMP 110 optionally detects the availability of the alternative payment option requested (Step 204). That is to say, the UMP 110 checks whether the servers of the alternative payment provider associated with the selected alternative payment option are unavailable. If the alternative payment option requested is unavailable, the UMP 110 flags it is being unavailable for subsequent transactions. The UMP 110 further provides the merchant 103 with a notification of the failure (Step 206), so the merchant 103 may fail gracefully and provide the consumer 102 with the option of selecting another method of payment.

Subsequent to obtaining the transaction information from the merchant 103 (Step 202), but after detecting the availability of the alternative payment provider (Step 206), the UMP 110 may need to initiate a transaction with the alternative payment provider 114 associated with the selected alternative payment option (Step 208). Such action is necessary when alternative payment implementation associated with the selected alternative payment option requires the consumer 102 to authenticate directly with the alternative payment provider 114. Accordingly, in some situations the UMP 110 will initiate communicates with the alternative payment provider 114 so as to retrieve a token. As described above, this process also entails setting a return redirection URL and providing the alternative payment provider 114 with transaction information, such as order information.

Subsequent to the preceding steps, the UMP 110 returns a redirection URL and a token to the merchant 103 (Step 210). As mentioned above, the token uniquely identifies the transaction to the UMP 110 or the alternative payment provider 114. The UMP 110 will further provide the merchant 103 with an order identifier for the merchant's 103 order management system 106. Merchants 103 use the order identifier in subsequent steps to complete the transaction.

After returning the redirection URL (Step 210), the UMP 110 may optionally obtain additional payment information from the consumer 102 (Step 212). This situation applies when the alternative payment provider 114 associated with the selected alternative payment option calls for additional payment information, and does not require the consumer 102 to authenticate directly with the alternative payment provider 114. In this step, the consumer 102 is provided with a web page where they are prompted to enter payment information specific to the alternative payment option selected. After the consumer 102 enters this information, the UMP 110 redirects the user to the merchant's website 104.

Regardless of how the consumer is returned to the merchant's site 104, once the consumer 102 is returned the UMP 110 obtains a transaction message from the merchant 103 (Step 214). The transaction message contains at least the order identifier of the transaction, an operation type and the amount to be transferred. The operation type is one of authorize/capture and refund. Additionally, the transaction message is formatted according to a unified message format. The unified message format is part of a unified payment implementation. The unified payment implementation allows the merchant 103 to implement a single payment implementation and access all the alternative payment implementations supported by UMP 110.

After obtaining the transaction message (Step 214), the UMP 110 proceeds to perform the operation specified in the transaction message (Step 216). In the case of an operation type of authorize/capture, the UMP 110 transfers funds from the consumer 102 to the merchant 103. In the case of a transaction message to refund funds, the UMP 110 transfers funds from the merchant 103 to the consumer 102. The operation is carried out using the alternative payment implementation associated with the transaction. That is to say, the UMP 110 performs the operation using the specific message formats, communication protocols and response codes called for by the alternative payment provider.

Once the UMP 110 has performed the transaction to completion (Step 216), the UMP 110 returns a processing message containing the results to the merchant (Step 218) 103. The results are formatted according to the unified message format used by the transaction message. The transaction message may further contain a transaction receipt from the alternative payment provider 114.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The invention claimed is:

1. A method of processing a transaction between a merchant system and a consumer over a communications network by at least one server operated by a third party, said method comprising:

obtaining, with the at least one server, customer transaction information from the merchant system received through a merchant website, wherein said customer transaction information identifies an alternative payment option of an alternative payment provider being used and selected by the consumer, and wherein the third party is independent of the alternative payment provider;

returning, with the at least one server, a redirection Uniform Resource Locator (URL) and an order identifier to the merchant system, wherein said redirection URL is dependent upon the identified alternative payment option of the alternative payment provider and the order identifier exists for a life cycle of the customer transaction, and wherein the redirection URL is configured to redirect a device operated by the consumer away from the merchant website to collect additional payment information from the consumer or obtain authentication from the consumer;

receiving, with the at least one server, a transaction message from said merchant system after the device operated by the consumer is redirected back to the merchant system, wherein said transaction message format includes a unified message format and said transaction message includes an operation type;

performing, with the at least one server, the operation type specified in the received transaction message with the alternative payment provider corresponding to the identified alternative payment option in accordance with a specific alternative payment implementation of the alternative payment option; and returning, with the at least one server, a processing message to the merchant system containing results from performing the operation type specified in the received transaction message, wherein said processing message format includes the unified message format.

2. The method of claim 1, wherein performing the operation type specified includes: using message formats, response codes and communication protocols of an alternative payment implementation corresponding to the identified alternative payment option of the alternative payment provider.

3. The method of claim 1, further comprising:
initiating the transaction with the alternative payment provider corresponding to the identified alternative payment option, prior to returning the redirection URL and the order identifier to the merchant.

4. The method of claim 1, further comprising:
detecting the availability of the identified alternative payment provider; and
in response to the alternative payment provider not being available, notifying the merchant system prior to returning the redirection URL and the order identifier to the merchant.

5. The method of claim 1, wherein the redirection URL points to the alternative payment provider of the identified alternative payment option.

6. The method of claim 1, wherein the redirection URL points to the at least one server of the third party, a system implementing the method, wherein the at least one server of the third party system is operative to collect additional payment information.

7. The method of claim 1, wherein the operation type includes at least one of: authorize, capture and refund.

8. The method of claim 1, wherein the alternative payment provider of the identified alternative payment option communicates asynchronously.

9. A system for supporting the processing of transactions between merchant systems and consumers over a communications network, said system, comprising:
one or more computer servers of a third party configured with:
a merchant layer configured to exchange communications with the merchant systems and receive customer transaction information and an operation type for each transaction, wherein said customer transaction information for each transaction includes payment information and identifies an alternative payment option of an alternative payment provider selected to be used by a consumer from a plurality of alternative payment providers through a merchant website;
a plug-in layer including a plurality of plug-in components, wherein each of the plurality of plug-in components administers a different one of the plurality of alternative payment providers in accordance with a respective alternative payment implementation, wherein the third party and the one or more computer servers of the third party are independent of the plurality of alternative payment providers; and
a logic layer residing between the merchant layer and the plug-in layer, wherein said logic layer is adapted to route communications between the merchant layer and selected plug-in components in the plug-in layer, wherein said operation type and said transaction information for each transaction are routed to the plug-in component responsible for administering the alternative payment option of the alternative payment provider associated with the customer transaction information for each transaction, and wherein said logic layer is adapted to return a redirection Uniform Resource Locator (URL) and a payment network routable order identifier to the merchant systems for each transaction, the redirection URL returned before receipt of the operation type, and wherein the redirection URL is configured to redirect devices operated by consumers away from a respective merchant website to collect additional payment information from the consumer or obtain authentication from the consumer.

10. The system of claim 9, further comprising a data layer, wherein the data layer stores the customer transaction information for each transaction.

11. The system of claim 9, wherein the logic layer is operative to disable a plug-in component if the alternative payment provider associated with the plug- in component is unavailable.

12. The system of claim 9, wherein the logic layer is operative to provide the merchant systems with daily summary reports of transactions.

13. The system of claim 9, wherein the logic layer is operative to communicate transactions to at least one processor.

14. The system of claim 9, further comprising a web layer, where said web layer receives additional payment information from the consumer, and where the redirection URL points to the system.

15. The system of claim 9, wherein the merchant layer communicates with the merchant systems using a unified message format.

16. The system of claim 9, wherein at least one of the plurality of plug-in components of the plug-in layer is adapted to receive asynchronous messages associated with the alternative payment provider of an alternate payment implementation.

17. The system of claim 9, wherein the plug-in layer allows selected plug-in components to be added, removed and modified without disrupting other plug-in components residing in the plug-in layer.

18. The system of claim 9, wherein the redirection URL points to the alternative payment provider of the identified alternative payment option.

19. The system of claim 9, wherein each operation type includes at least one of: authorize, capture, and refund.

20. A system for processing a transaction between a merchant system and a consumer over a communications network, said system comprising:
one or more servers of a third party programmed to:
obtain transaction information for the transaction from the merchant system through a merchant website, wherein said transaction information identifies an alternative payment option of an alternative payment provider being used for the transaction and which is selected by the consumer, and wherein the third party is independent of the alternative payment provider;

return a redirection Uniform Resource Locator (URL) and an order identifier to the merchant system to obtain additional transaction information for the transaction, wherein said redirection URL is dependent upon the alternative payment option identified by the obtained transaction information, and wherein the redirection URL is configured to redirect a device operated by the consumer away from the merchant website to collect additional payment information from the consumer or obtain authentication from the consumer;

after the additional transaction information is collected and after the device operated by the consumer is redirected back to the merchant website, receive a transaction message from said merchant system, wherein said transaction message format includes a unified message format and said transaction message includes an operation type;

perform the operation type specified in the transaction message with the alternative payment provider corresponding to the alternative payment option identified by the obtained transaction information using the obtained transaction information, and a specific alternative payment implementation of the alternative payment option, to complete the transaction; and, return a processing message to the merchant system containing results from performing the operation type specified in the transaction message, wherein said processing message format includes the unified message format.

21. The method of claim 1, wherein:
in response to the redirection URL being used to collect additional payment information, the redirection URL points to the at least one server of the third party.

22. The method of claim 1, wherein:
in response to the redirection URL being used for consumer authentication, the redirection URL points to an alternative payment server of the alternative payment provider.

23. The method of claim 1, wherein:
the redirection URL is dependent upon whether the identified alternative payment option of the alternative payment provider requires the consumer to directly authenticate and enter additional information with the alternative payment provider.

* * * * *